United States Patent
Dejneka et al.

(10) Patent No.: US 10,494,292 B2
(45) Date of Patent: Dec. 3, 2019

(54) FICTIVATED GLASS AND METHOD OF MAKING

(71) Applicant: CORNING INCORPORATED, Corning, NY (US)

(72) Inventors: Matthew John Dejneka, Corning, NY (US); Xiaoju Guo, Painted Post, NY (US); John Christopher Mauro, Corning, NY (US)

(73) Assignee: CORNING INCORPORATED, Corning, NY (US)

( * ) Notice: Subject to any disclaimer, the term of this patent is extended or adjusted under 35 U.S.C. 154(b) by 381 days.

(21) Appl. No.: 14/764,799

(22) PCT Filed: Jan. 28, 2014

(86) PCT No.: PCT/US2014/013263
§ 371 (c)(1),
(2) Date: Jul. 30, 2015

(87) PCT Pub. No.: WO2014/120628
PCT Pub. Date: Aug. 7, 2014

(65) Prior Publication Data
US 2015/0368147 A1    Dec. 24, 2015

Related U.S. Application Data

(60) Provisional application No. 61/759,061, filed on Jan. 31, 2013.

(51) Int. Cl.
C03C 3/093    (2006.01)
C03C 3/091    (2006.01)
C03C 21/00    (2006.01)
C03B 27/012   (2006.01)

(52) U.S. Cl.
CPC ............ *C03C 3/093* (2013.01); *C03B 27/012* (2013.01); *C03C 3/091* (2013.01); *C03C 21/002* (2013.01); *Y10T 428/315* (2015.01)

(58) Field of Classification Search
None
See application file for complete search history.

(56) References Cited

U.S. PATENT DOCUMENTS

| | | |
|---|---|---|
| 3,772,135 A | 11/1973 | Hera et al. |
| 8,075,999 B2 | 12/2011 | Barefoot et al. |
| 8,232,218 B2 | 7/2012 | Dejneka et al. |

(Continued)

FOREIGN PATENT DOCUMENTS

| | | |
|---|---|---|
| JP | 2009233911 | 10/2009 |
| WO | 2012074949 A1 | 6/2012 |
| WO | 2013181134 | 12/2013 |

OTHER PUBLICATIONS

Boyd et al; "Glass" Kirk-Othmer Encyclopedia of Chemical Technology; vol. 12, 4th Edition 74 pages.

(Continued)

*Primary Examiner* — David Sample
(74) *Attorney, Agent, or Firm* — Kevin M. Johnson (57) ABSTRACT

Silicate glasses that are fictivated and fast cooled and have high levels of intrinsic or "native" damage resistance. When ion exchanged, the silicate glasses described herein have a Vickers crack initiation threshold of at least 15 kgf and, in some embodiments, at least about 25 kgf.

35 Claims, 4 Drawing Sheets

(56) References Cited

U.S. PATENT DOCUMENTS

| | | | |
|---|---|---|---|
| 9,145,333 B1* | 9/2015 | Dejneka | C03C 3/091 |
| 9,517,967 B2* | 12/2016 | Dejneka | C03C 3/093 |
| 2005/0250639 A1 | 11/2005 | Siebers et al. | |
| 2008/0286548 A1 | 11/2008 | Ellison et al. | |
| 2009/0142568 A1 | 6/2009 | Dejneka et al. | |
| 2009/0220761 A1* | 9/2009 | Dejneka | C03B 17/067 428/220 |
| 2010/0009154 A1 | 1/2010 | Allan et al. | |
| 2010/0291353 A1* | 11/2010 | Dejneka | C03B 33/0222 428/192 |
| 2011/0045961 A1 | 2/2011 | Dejneka et al. | |
| 2011/0071012 A1* | 3/2011 | Kondo | C03C 3/085 501/71 |
| 2011/0092354 A1 | 4/2011 | Duran et al. | |
| 2011/0201490 A1 | 8/2011 | Barefoot et al. | |
| 2011/0294648 A1 | 12/2011 | Chapman et al. | |
| 2013/0004758 A1 | 1/2013 | Dejneka et al. | |
| 2013/0017366 A1* | 1/2013 | Kawaguchi | C03B 17/067 428/141 |
| 2013/0255314 A1* | 10/2013 | Allan | C03C 21/00 65/30.14 |
| 2013/0260154 A1* | 10/2013 | Allan | C03B 32/00 428/410 |
| 2014/0179510 A1* | 6/2014 | Allan | C03C 3/093 501/67 |
| 2014/0186632 A1* | 7/2014 | Dejneka | C03C 3/083 428/410 |
| 2015/0004390 A1* | 1/2015 | Kawamoto | C03C 4/18 428/220 |

OTHER PUBLICATIONS

Guo et al; "Unified approach for determining the enthalpic fictive temperature of glasses with arbitrary thermal history"; Journal of Non-Crystalline Solids, 357, (2011) 3230-3236.

Gupta et al; "Boron Coordination in Rapidly Cooled and in Annealed Aluminum Borosilicate Glass Fibers"; J. Am. Ceram. Soc., 68 (3), C-82 (1985).

Akio Makishima et al; "Glass Material design support system: VitrES", Fujitsu, Japan, FujitsuCorporation, Nov. 10, 1993, vol. 44, No. 6, p. 560-565, ISSN: 0016-2515.

English Translation of JP2015556075 Office Action dated Dec. 26, 2018, Japan Patent Office, 3 Pgs.

Kazuya Saitoh, "What is the fictive temperature?" New Glass 104, Japan, aggregate corporation New Glass Form, Mar. 2012, vol. 57, No. 1, pp. 49-52, ISSN: 0914-6563 (Translation Attached).

English Translation of JP2015556075 First Office Action Dispatched on Feb. 6, 2018; 3 pages; Japanese Patent Office.

* cited by examiner

FICTIVATED GLASS AND METHOD OF MAKING

CROSS-REFERENCE TO RELATED APPLICATIONS

This application claims the benefit of priority under 35 U.S.C. § 365 of International Patent Application Serial No. PCT/US14/13263 filed on Jan. 28, 2014, which claims the benefit of priority under 35 U.S.C. § 119 of U.S. Provisional Application Ser. No. 61/759,061 filed on Jan. 31, 2013 the content of which is relied upon and incorporated herein by reference in its entirety.

BACKGROUND

The disclosure relates to glasses that are capable of chemical strengthening by ion exchange and have intrinsic damage resistance. More particularly, the disclosure relates to such glasses that are fast cooled and ion exchanged.

Ion exchangeable glass compositions offer advantages in glass manufacturability and/or final properties compared to previous glass compositions. Such glasses are used in applications such as, but not limited to, cover glasses, windows, enclosures, and the like in a variety of electronic devices, including displays in entertainment and communication devices. Post-forming annealing processes tend to decrease the damage resistance of such glasses.

SUMMARY

Silicate glasses that are fast cooled or fictivated and have high levels of intrinsic or "native" damage resistance are provided. When ion exchanged, the silicate glasses described herein have a Vickers crack initiation threshold of at least 15 kgf and, in some embodiments, at least about 25 kgf.

Accordingly, one aspect of the disclosure is to provide silicate glass having a Vickers crack initiation threshold of at least 15 kgf. The silicate glass comprising: at least about 50 mol % $SiO_2$; at least about 10 mol % $R_2O$, wherein $R_2O$ comprises $Na_2O$; $Al_2O_3$, wherein $-0.5$ mol % $\leq Al_2O_3$ (mol %)$-R_2O$ (mol %)$\leq 2$ mol %; and $B_2O_3$, wherein $B_2O_3$ (mol %)$-(R_2O$ (mol %)$-Al_2O_3$ (mol %))$\geq 4.5$ mol %. The silicate glass has a fictive temperature that is greater than or equal to a temperature at which a super-cooled liquid having the composition of the silicate glass is $10^{12}$ Poise.

A second aspect of the disclosure is to provide a silicate glass having a zircon breakdown temperature that is equal to the temperature at which the silicate glass has a viscosity in a range from about 30 kPoise to about 40 kPoise, a Vickers crack initiation threshold of at least 15 kgf, and a strain point. The silicate glass comprises: at least about 50 mol % $SiO_2$; at least about 10 mol % $R_2O$, wherein $R_2O$ comprises $Na_2O$; $Al_2O_3$, wherein $Al_2O_3$ (mol %)$<R_2O$ (mol %); and $B_2O_3$, wherein $B_2O_3$ (mol %)$-(R_2O$ (mol %)$-Al_2O_3$ (mol %))$\geq 2$ mol %, and wherein the silicate glass has a fictive temperature that is greater than or equal to a temperature at which a super-cooled liquid having the composition of the silicate glass is $10^{12}$ Poise.

A third aspect of the disclosure is to provide a method of making a silicate glass having a Vickers crack initiation threshold of at least 15 kgf. The silicate glass comprises: at least about 50 mol % $SiO_2$; at least about 10 mol % $R_2O$, wherein $R_2O$ comprises $Na_2O$; and $B_2O_3$, and wherein $B_2O_3$ (mol %)$-(R_2O$ (mol %)$-Al_2O_3$ (mol %))$\geq 2$ mol %. The method comprises heating the silicate glass to a first temperature at which the glass has a viscosity in a range from about $10^9$ poise to about $10^{13}$ poise and fast cooling the silicate glass from the first temperature to a second temperature, wherein the second temperature is less than a strain point of the silicate glass, and wherein the fast cooled silicate glass has a Vickers crack initiation threshold of at least 15 kgf.

These and other aspects, advantages, and salient features will become apparent from the following detailed description, the accompanying drawings, and the appended claims.

BRIEF DESCRIPTION OF THE DRAWINGS

FIG. 1 is a plot of average compressive stresses (CS) and depths of layer (DOL) for the glasses listed in Tables 1 and 3a;

DETAILED DESCRIPTION

In the following description, like reference characters designate like or corresponding parts throughout the several views shown in the figures. It is also understood that, unless otherwise specified, terms such as "top," "bottom," "outward," "inward," and the like are words of convenience and are not to be construed as limiting terms. In addition, whenever a group is described as comprising at least one of a group of elements and combinations thereof, it is understood that the group may comprise, consist essentially of, or consist of any number of those elements recited, either individually or in combination with each other. Similarly, whenever a group is described as consisting of at least one of a group of elements or combinations thereof, it is understood that the group may consist of any number of those elements recited, either individually or in combination with each other. Unless otherwise specified, a range of values, when recited, includes both the upper and lower limits of the range as well as any ranges therebetween. As used herein, the indefinite articles "a," "an," and the corresponding definite article "the" mean "at least one" or "one or more," unless otherwise specified. It also is understood that the various features disclosed in the specification and the drawings can be used in any and all combinations.

As used herein, the terms "glass" and "glasses" includes both glasses and glass ceramics. The terms "glass article" and "glass articles" are used in their broadest sense to include any object made wholly or partly of glass and/or glass ceramic.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

Figure 1:
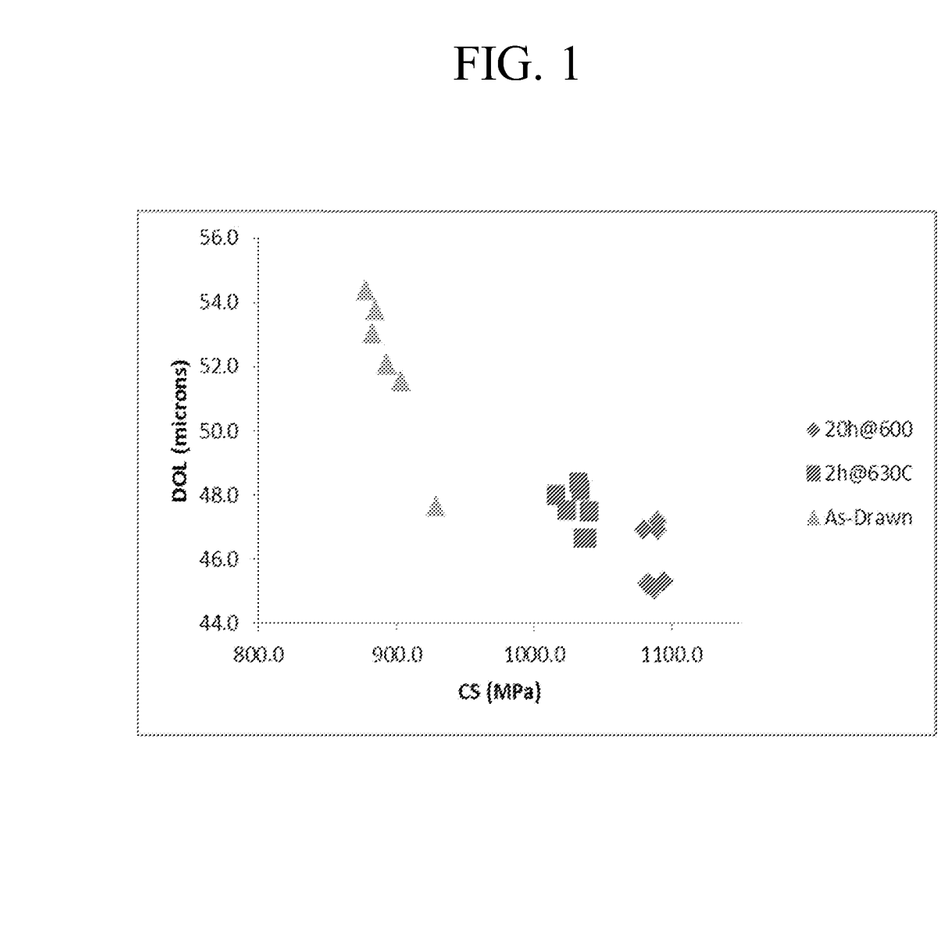

Referring to the drawings in general and to FIG. 1 in particular, it will be understood that the illustrations are for the purpose of describing particular embodiments and are not intended to limit the disclosure or appended claims thereto. The drawings are not necessarily to scale, and certain features and certain views of the drawings may be shown exaggerated in scale or in schematic in the interest of clarity and conciseness.

New ion exchangeable glass compositions are continually being developed to offer advantages in glass manufacturability and/or final properties compared to previous glass compositions. Such glasses are used in applications such as, but not limited to, cover glasses, windows, enclosures, and the like in a variety of electronic devices, including displays in entertainment and communication devices.

Presently, such glasses are typically based on two similar glass systems: $SiO_2$—$Al_2O_3$—$B_2O_3$—$MgO$—$Na_2O$—$P_2O_5$ and $SiO_2$—$Al_2O_3$—$MgO$—$Na_2O$. Due to the presence of boron or phosphorus in the glass, the first group of glasses generally exhibits a high indentation threshold, as measured by Vickers crack indentation experiments, after ion exchange. The presence of boron and phosphorus generates an open structure (i.e., high molar volume) in the glass.

In addition to compositional effects, open structures may also be generated by thermal history. Described herein are ion exchangeable silicate glasses in which high damage resistance/indentation threshold is introduced through thermal treatment of ion exchanged glass sheets. The indentation threshold is improved by use of a post-forming fictivation process. As used herein, "fictivation" refers to imposing a specified fictive temperature or thermal history on a glass through appropriate heat treatment. The term "fast cooling" refers to cooling a material from a first temperature to a second temperature at a rate of at least 5° C./s. Specifically, these terms, as used herein, refer to the heating of the glass to a first temperature at which the glass has a viscosity of less than $10^{13}$ poise (P) followed by equilibrating the glass at the first temperature for a predetermined time period, and then quickly quenching the glass to a second temperature below the strain point of the glass. In some embodiments, the glass is heated to a first temperature at which the glass has a viscosity in a range from about $10^9$ poise to about $10^{13}$ poise followed by equilibration at the first temperature and rapid quenching to a second temperature below the strain point of the glass, and in other embodiments, fictivation includes heating the glass to a first temperature at which the viscosity of the glass is in a range from about $10^9$ poise to about $10^{11}$ poise followed by equilibration at that temperature and rapid quenching to a second temperature that is below the strain point of the glass. In some embodiments, fictivation includes heating the glass to a first temperature at which the glass viscosity is about $10^{10}$ poise (P), followed by equilibrating the glass at that temperature for a predetermined time period, and then quickly quenching the glass to a second temperature below the strain point of the glass. In some embodiments, the glass is fast cooled from the first temperature to a second temperature which is about room temperature (25° C.±10° C.).

In contrast to fictivation, post-forming annealing processes tend to decrease the indentation threshold of glasses. By fast cooling, the indentation threshold may at least two times greater than that achieved by slowly cooled or annealed glasses. The temperature where fast cooling should start to generate high indentation threshold corresponds to a critical viscosity at around $10^9$-$10^{11}$ poise, in some embodiments, around $10^9$-$10^{11}$ poise, and in other embodiments, around $10^{10}$-$10^{10.5}$ poise.

As used herein, the term "fictive temperature" refers to the temperature which reflects the structural contribution to the enthalpy of the glass. The fictive temperature of a glass may be determined by calorimetric methods, as described by Xiaoju Guo et al. in "Unified approach for determining the enthalpic fictive temperature of glasses with arbitrary thermal history," (Journal of Non-Crystalline Solids 357 (2011) pp. 3230-3236). The contents of which are incorporated herein by reference in their entirety. In the glasses described herein, the fictive temperature is greater than or equal to the temperature at which the viscosity of the glass-forming liquid (i.e., a supercooled liquid of the same composition) is $10^{12}$ Poise.

Described herein are silicate glasses that are fast cooled or fictivated and have high levels of intrinsic or "native" damage resistance. When ion exchanged, the silicate glasses described herein have a Vickers crack initiation threshold of at least 15 kgf and, in some embodiments, at least about 25 kgf.

In some aspects, the silicate glasses described herein comprise at least about 50 mol % $SiO_2$; at least about 10 mol % $R_2O$, where $R_2O$ comprises $Na_2O$; $Al_2O_3$, wherein −0.5 mol %≤$Al_2O_3$ (mol %)–$R_2O$ (mol %)≤2 mol %; and $B_2O_3$, wherein $B_2O_3$ (mol %)–($R_2O$ (mol %)–$Al_2O_3$ (mol %))≥4.5 mol %. In some embodiments, these glasses comprise at least about 50 mol % $SiO_2$, from about 9 mol % to about 22 mol % $Al_2O_3$, from about 3 mol % to about 10 mol % $B_2O_3$, from about 9 mol % to about 20 mol % $Na_2O$, from 0 mol % to about 5 mol % $K_2O$, 0 mol %≤MgO≤6 mol %, and 0 mol %≤ZnO≤6 mol %. In addition, the glasses may optionally comprise at least one of CaO, BaO, and SrO, wherein 0 mol %≤CaO+SrO+BaO≤2 mol %.

In other embodiments, the silicate glass comprises at least about 50 mol % $SiO_2$, at least about 10 mol % $R_2O$, wherein $R_2O$ comprises $Na_2O$; $Al_2O_3$, wherein $Al_2O_3$ (mol %)<$R_2O$ (mol %); and $B_2O_3$, wherein $B_2O_3$ (mol %)–($R_2O$ (mol %)–$Al_2O_3$ (mol %))≥2 mol %. In some embodiments, these glasses comprise at least about 50 mol % $SiO_2$, from about 9 mol % to about 22 mol % $Al_2O_3$, from about 3 mol % to about 10 mol % $B_2O_3$, from about 9 mol % to about 20 mol % $Na_2O$, from 0 mol % to about 5 mol % $K_2O$, from 0 mol % to about 6 mol % MgO; and from 0 mol % to about 6 mol % ZnO. In addition, the glasses may optionally comprise at least one of CaO, BaO, and SrO, wherein 0 mol %≤CaO+SrO+BaO≤2 mol %.

The silicate glasses described herein have a fictive temperature that is is greater than or equal to the temperature at which the viscosity of the glass-forming liquid (i.e., a supercooled liquid of the same composition) is $10^{12}$ Poise. In some embodiments, the glass is fast cooled or fictivated from a first temperature above the anneal point of the glass to a temperature that is below the strain point of the glass. In some embodiments, the glass is fast cooled from the first temperature to room temperature (25° C.±10° C.).

Only certain glass compositions exhibit indentation threshold values that are most affected by thermal history. In the silicate glass compositions described herein, $SiO_2$ serves as the primary glass-forming oxide. The concentration of $SiO_2$ in the glass should be sufficiently high in order to provide the glass with sufficiently high chemical durability that is suitable for some applications such as, for example touch screen applications. However, the melting temperature (200 poise temperature) of pure $SiO_2$ or glasses having high $SiO_2$ contents is considered too high, since defects such as fining bubbles may appear during manufacture. Furthermore, $SiO_2$, compared to most oxides, decreases the level of compressive stress created by ion exchange. Accordingly, the silicate glasses described herein comprise at least 50 mol % $SiO_2$. In some embodiments, these glasses comprise from about 66 mol % to about 74 mol % $SiO_2$ and, in other embodiments from about 60 mol % to about 66 mol % $SiO_2$.

Alumina ($Al_2O_3$) can also serve as a glass former in these silicate glasses. Like $SiO_2$, alumina generally increases the viscosity of the melt. In addition, an increase in $Al_2O_3$ relative to the alkalis or alkaline earths generally results in improved durability of the glass. In some embodiments, −0.5 mol %≤$Al_2O_3$ (mol %)−$R_2O$ (mol %)≤2 mol %. In other embodiments, $Al_2O_3$ (mol %)<$R_2O$ (mol %). The structural role of the aluminum ions depends on the glass composition. When the concentration of alkali oxide(s) [$R_2O$] is greater than or equal to the concentration of alumina [$Al_2O_3$], all aluminum is found in tetrahedral coordination with the alkali ions acting as charge-balancers. This is the case for some of the glasses described herein. In other glasses, the concentration of alkali oxide is less than the concentration of aluminum ions, in which case divalent cation oxides (RO) can also charge balance tetrahedral aluminum to various extents. While elements such as calcium, zinc, strontium, and barium behave equivalently to two alkali ions, the high field strength of magnesium ions cause them to not fully charge balance aluminum in tetrahedral coordination, resulting in formation of five- and six-fold coordinated aluminum. Generally, $Al_2O_3$ plays an extremely important role in ion-exchangeable glasses, since it enables a strong network backbone (i.e., high strain point) while allowing for relatively fast diffusivity of alkali ions. High $Al_2O_3$ concentrations, however, generally lower the liquidus viscosity. $Al_2O_3$ concentration therefore needs to be kept in a reasonable range. In some embodiments, the silicate glasses described herein comprise from about 9 mol % to about 22 mol % $Al_2O_3$ and, in other embodiments, the glasses comprise from about 12 mol % to about 22 mol % $Al_2O_3$.

The silicate glasses described herein comprise at least about 10 mol % alkali metal oxides $R_2O$, wherein $R_2O$ includes $Na_2O$. Alkali metal oxides ($Li_2O$, $Na_2O$, $K_2O$, $Rb_2O$, and $Cs_2O$) serve as aids in achieving low melting temperature and low liquidus temperatures of the glass. However, the addition of alkali oxide(s) dramatically increases the coefficient of thermal expansion (CTE) and lowers the chemical durability of the glass. The silicate glasses described herein, in some embodiments, comprise from about 9 mol % to about 20 mol % $Na_2O$ and, in other embodiments, from about 10 mol % to about 20 mol % $Na_2O$. The glasses may also comprise from 0 mol % to about 5 mol % $K_2O$. To perform ion exchange, the presence of a small alkali oxide such as $Li_2O$ and $Na_2O$ is required to exchange with larger alkali ions (e.g., $K^+$) from a salt bath or other ion exchange medium. Three types of ion exchange can generally be carried out: $Na^-$-for-$Li^+$ exchange, which results in a deep depth of layer but low compressive stress; $K^+$-for-$Li^+$ exchange, which results in a small depth of layer but a relatively large compressive stress; and $K^+$-for-$Na^+$ exchange, which results in intermediate depth of layer and compressive stress. A sufficiently high concentration of the small alkali oxide is necessary to produce a large compressive stress in the glass, since compressive stress is proportional to the number of alkali ions that are exchanged out of the glass. In some of the example glasses, a small amount of $K_2O$ is introduced into the glass to improve diffusivity and lowers the liquidus temperature, but it generally increases the CTE and decreases CS. Thus, the potassium concentration of the glass is kept at a very low level (e.g., ≤5 mol %) and, in certain embodiments, the glass is free of potassium. In certain embodiments, the silicate glass is free of lithium.

Divalent cation oxides (such as alkaline earth oxides and ZnO) also improve the melting behavior of the glass. With respect to ion exchange performance, however, the presence of divalent cations acts to decrease alkali mobility. The negative effect of divalent cations on ion exchange performance is especially pronounced with the larger divalent cations. Furthermore, the smaller divalent cation oxides (e.g., MgO, ZnO) generally help increase the compressive stress of the glass more than the larger divalent cations. Hence, MgO and ZnO offer several advantages with respect to improved stress relaxation while minimizing the adverse effects on alkali diffusivity. However, when the concentrations of MgO and ZnO in the glass are high, these oxides are prone to form forsterite ($Mg_2SiO_4$) and gahnite ($ZnAl_2O_4$) or willemite ($Zn_2SiO_4$), respectively, thus causing the liquidus temperature of the glass to rise very steeply when the MgO and ZnO contents are above certain levels. In some embodiments, the silicate glass comprises at least about 0.1 mol % of at least one of MgO and ZnO, and in some embodiments, 0 mol %≤MgO≤6 mol % and 0 mol %≤ZnO≤6 mol %. In some embodiments, either MgO or ZnO as the only divalent cation oxide in the glass; i.e., the glass is free of other alkaline earth oxides (CaO, BaO, SrO). In other embodiments, however, the glass may include at least one of CaO, BaO, and SrO, wherein 0 mol %≤CaO+SrO+BaO≤2 mol %.

The glasses described herein comprise $B_2O_3$ and, in some embodiments, the glass comprises from about 3 mol % to about 10 mol % $B_2O_3$. The addition of $B_2O_3$ and $P_2O_5$ improve the damage resistance of the glass. When boron is not charge balanced by alkali oxides or divalent cation oxides, it will be in trigonal coordination state, and thus open up the structure and provide greater damage resistance. The network around these trigonal coordinated borons is not as rigid as tetrahedrally coordinated ones, the bonds are floppy, and therefore the glasses can tolerate some deformation before crack formation. In some embodiments, the silicate glass comprises greater than 4.5 mol % $B_2O_3$ in which boron cations are three-fold coordinated. In other embodiments, the glass comprises greater than 2 mol % $B_2O_3$ in which boron cations are three-fold coordinated and, in some embodiments the silicate glass comprises from about 2 mol % to about 4.5 mol % of three-fold coordinated boron cations. In certain embodiments, $B_2O_3$ (mol %)−($R_2O$ (mol %)−$Al_2O_3$ (mol %))≥2 mol %, and some embodiments, $B_2O_3$ (mol %)−($R_2O$ (mol %)−$Al_2O_3$ (mol %))≤4.5 mol %. In some embodiments, $B_2O_3$ (mol %)−($R_2O$ (mol %)−$Al_2O_3$ (mol %))≥4.5 mol %. Furthermore, both boron and phosphorus decrease the melting viscosity and effectively help to suppress zircon breakdown viscosity.

Figure 4:
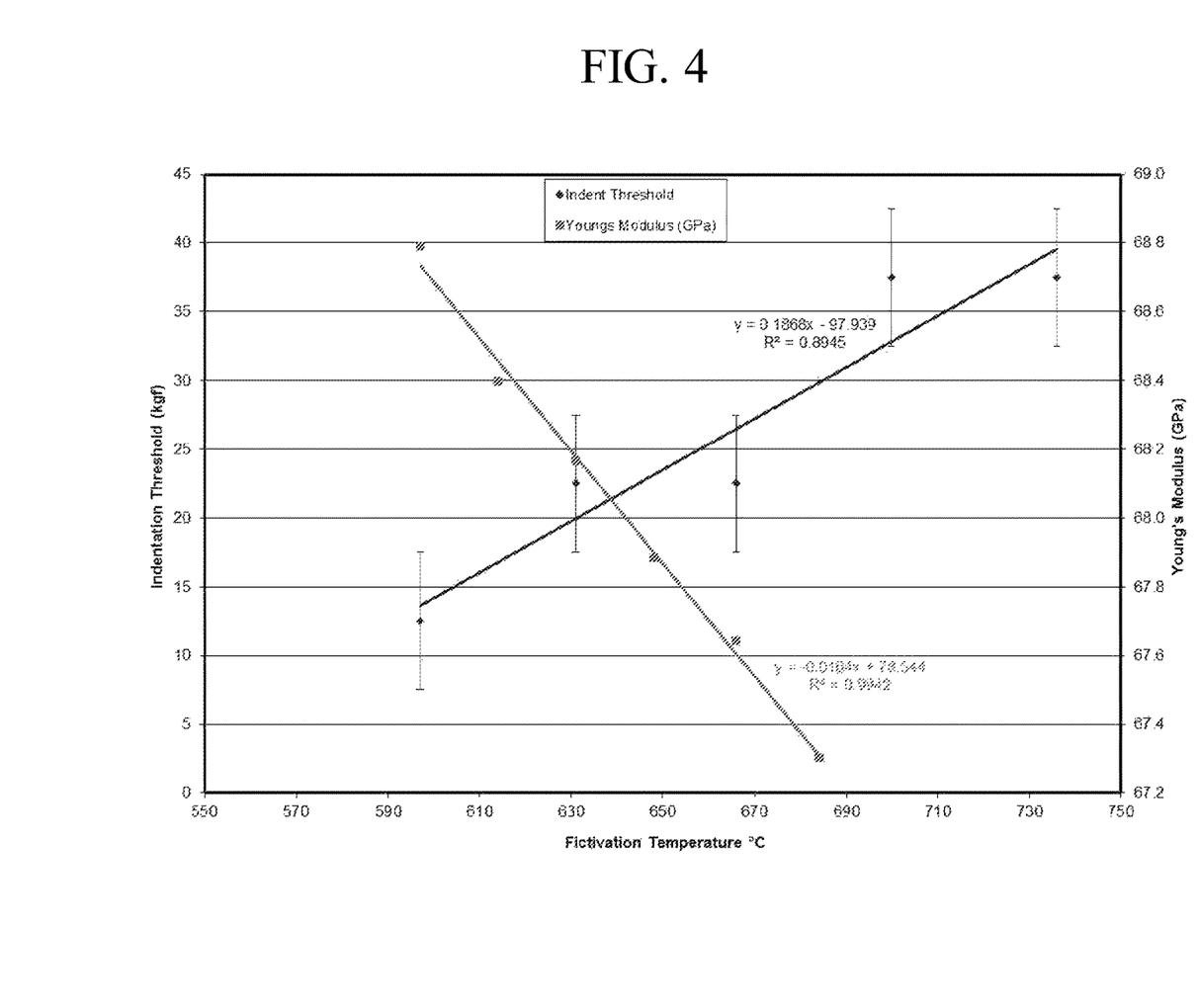
FIG. 4 is a plot of Vickers indentation threshold and Young's modulus as a function of fictive temperature

Unlike $B_2O_3$, $P_2O_5$ can improve the diffusivity of alkali cations and decrease ion exchange times. In some embodiments, the glasses described herein, $P_2O_5$ may replace at least a portion of $B_2O_3$ in the glass such that 4.5 mol %≤$B_2O_3$ (mol %)+$P_2O_5$ (mol %)≤10 mol %. However, the floppy structure formed by boron and phosphorus sacrifice some compressive stress capability where the effect from $P_2O_5$ is also pronounced. The coordination number change of $B_2O_3$ on fictive temperature is the source of the variation of indentation threshold with thermal history. The compositions included herein are boron containing glasses. Trigonally coordinated boron in glasses with higher fictive temperatures will partially convert to tetrahedral coordinated when the fictive temperature of the glass decreases. During annealing or heat treatment, the fictive temperature of the glass will be reduced, and the amount of trigonal coordinated boron will therefore decrease. If this change is dramatic, the level of trigonally coordinated boron will not be sufficient to sustain the open glass structure. FIG. 4, which is a plot of Vickers indentation threshold and Young's modulus as a function of fictive temperature, shows that the elastic modulus increases and the indentation threshold decreases as the fictive temperature is lowered. As the fictive temperature decreases, the glass becomes denser and less able to accommodate mechanical insult. As seen in FIG. 4, the indentation threshold can be dramatically reduced as a result of a decrease in fictive temperature.

In some embodiments, the silicate glasses described herein may further comprise at least one transition metal oxide colorant comprising at least one of $V_2O_5$, NiO, CuO, $Cr_2O_3$, $MnO_2$, $Fe_2O_3$, $Co_3O_4$, $Nb_2O_5$, and $TiO_2$. In such instances, the transition metal oxide colorants may comprise up to 6 mol % of the glass; i.e., 0 mol % ≤ $V_2O_5$ ≤ 6 mol %, 0 mol % ≤ NiO ≤ 6 mol %, 0 mol % ≤ CuO ≤ 6 mol %, 0 mol % ≤ $Cr_2O_3$ ≤ 6 mol %, 0 mol % ≤ $MnO_2$ ≤ 6 mol %, 0 mol % ≤ $Fe_2O_3$ ≤ 6 mol %, 0 mol % ≤ $Co_3O_4$ ≤ 6 mol % 0 mol % ≤ $Nb_2O_5$ ≤ 6 mol %, and 0 mol % ≤ $TiO_2$ ≤ 6 mol %.

In some aspects, the glasses described herein are ion exchanged by those means known in the art such as, for example immersion in a molten salt bath containing salts of the cation that is to replace the cation in the glass. Cations—typically monovalent alkali metal cations that which are present in these glasses are replaced with larger cations—typically monovalent alkali metal cations, although other cations such as $Ag^-$ or $Tl^-$ may be used—having the same valence or oxidation state. The replacement of smaller cations with larger cations creates a surface layer that is under compression, or compressive stress CS. This layer extends from the surface of the glass into the interior or bulk of the glass to a depth of layer DOL. The compressive stress in the surface layers of the glass are balanced by a tensile stress, or central tension CT, in the interior or inner region of the glass. The ion exchanged glasses, in some embodiments, have a surface layer under a compressive stress of at least about 800 MPa and, in certain embodiments, at least 900 MPa, wherein the layer extends to a depth of layer of at least about 45 μm and, in some embodiments, at least about 30 μm. Compressive stress and depth of layer are measured using those means known in the art. Such means include, but are not limited to measurement of surface stress (FSM) using commercially available instruments such as the FSM-6000, manufactured by Luceo Co., Ltd. (Tokyo, Japan), or the like. Methods of measuring compressive stress and depth of layer are described in ASTM 1422C-99, entitled "Standard Specification for Chemically Strengthened Flat Glass," and ASTM 1279.19779 "Standard Test Method for Non-Destructive Photoelastic Measurement of Edge and Surface Stresses in Annealed, Heat-Strengthened, and Fully-Tempered Flat Glass," the contents of which are incorporated herein by reference in their entirety. Surface stress measurements rely upon the accurate measurement of the stress optical coefficient (SOC), which is related to the stress-induced birefringence of the glass. SOC in turn is measured by those methods that are known in the art, such as fiber and four point bend method, both of which are described in ASTM standard C770-98 (2008), entitled "Standard Test Method for Measurement of Glass Stress-Optical Coefficient," the contents of which are incorporated herein by reference in their entirety, and a bulk cylinder method.

The ion exchanged glasses described herein possess a degree of intrinsic damage resistance (IDR), which may be characterized by the Vickers crack initiation threshold of the ion exchanged glass. In some embodiments, the ion exchanged glass has a Vickers crack initiation threshold of at least about 15 kgf. In some embodiments, the ion exchanged glass has a Vickers crack initiation threshold in a range from about 20 kgf to about 30 kgf and, in other embodiments, at least about 25 kgf. The Vickers crack initiation threshold measurements described herein are performed by applying and then removing an indentation load to the glass surface at a rate of 0.2 mm/min. The maximum indentation load is held for 10 seconds. The crack initiation threshold is defined at the indentation load at which 50% of 10 indents exhibit any number of radial/median cracks emanating from the corners of the indent impression. The maximum load is increased until the threshold is met for a given glass composition. All indentation measurements are performed at room temperature in 50% relative humidity.

Non-limiting examples of glass compositions in which the post-ion exchange Vickers indentation threshold is greatly affected by fast cooling and the respective physical properties of these glasses are listed in Table 1. All glasses were fusion formed and fast cooled. The compositions were analyzed using x-ray fluorescence and/or optical emission spectrometry (ICP-OES) plus FES. Anneal and strain points were determined by beam bending viscometry and softening points were determined by parallel plate viscometry. The coefficient of thermal expansion (CTE) is the average value between room temperature and 300° C. Elastic moduli were determined by resonant ultrasound spectroscopy. Refractive index is stated for 589.3 nm. Stress optic coefficient (SOC) was determined by the diametral compression method.

Table 2 lists additional compositions in which the Vickers indentation threshold of ion exchanged glass was greatly affected by fast cooling. All of the glasses listed in Table 2 were fusion formed and fictivated, and the compositions reported were either batched of analyzed using either x-ray fluorescence or ICP.

TABLE 1

Compositions and physical properties of fusion drawn fast cooled glasses.

| Composition (mol %) | Ref. A | Glass 2 | Glass 3 | Glass 4 | Glass 5 | Glass 6 | Ref. B |
|---|---|---|---|---|---|---|---|
| $Al_2O_3$ | 13.9 | 13.6 | 13.3 | 13.3 | 13.1 | 12.9 | 12.7 |
| $Na_2O$ | 13.6 | 13.6 | 13.6 | 13.7 | 13.6 | 13.6 | 13.6 |
| MgO | 2.4 | 2.4 | 2.4 | 2.4 | 2.3 | 2.4 | 2.4 |
| $B_2O_3$ | 5.1 | 4.9 | 4.6 | 4.0 | 4 | 3.8 | 3.7 |
| $SiO_2$ | 64.9 | 65.4 | 65.9 | 66.5 | 66.7 | 67.1 | 67.5 |
| $SnO_2$ | 0.07 | 0.09 | 0.09 | 0.09 | 0.09 | 0.09 | 0.09 |
| Anneal Pt. (° C.): | 625 | 626 | 628 | 629 | 630 | 632 | 631 |
| Strain Pt. (° C.): | 572 | 574 | 574 | 576 | 577 | 579 | 578 |
| Softening Pt. (° C.): | 893.4 | 896 | 899.3 | 900.4 | 903 | 902.4 | 903.1 |
| Density (g/cm³): | 2.39 | 2.391 | 2.392 | 2.392 | 2.393 | 2.393 | 2.393 |
| CTE (×10⁻⁷/° C.): | 75.1 | 74.8 | 74.6 | 75 | 75.5 | 75.8 | 75.1 |
| Poisson's Ratio: | 0.22 | 0.218 | 0.22 | 0.217 | 0.221 | 0.213 | 0.2 |
| Shear Modulus (Mpsi): | 4.047 | 4.077 | 4.086 | 4.094 | 4.105 | 4.125 | 4.157 |
| Young's Modulus (Mpsi): | 9.873 | 9.934 | 9.968 | 9.963 | 10.024 | 10.004 | 9.975 |

TABLE 1-continued

Compositions and physical properties of fusion drawn fast cooled glasses.

| Composition (mol %) | Ref. A | Glass 2 | Glass 3 | Glass 4 | Glass 5 | Glass 6 | Ref. B |
|---|---|---|---|---|---|---|---|
| Refractive Index: | 1.497 | 1.497 | 1.496 | 1.496 | 1.496 | 1.496 | 1.496 |
| Stress optic coefficient | 32.7 | 32.5 | 32.4 | 32.3 | 32.2 | 32.0 | 31.9 |

TABLE 2

Compositions and physical properties of fast cooled, fictivated glasses.

| Composition (mol %) | Glass 8 | Glass 9 | Glass 10 | Glass 11 | Glass 12 |
|---|---|---|---|---|---|
| $SiO_2$ | 65.74 | 65.86 | 64.5 | 64.5 | 64.5 |
| $Al_2O_3$ | 13.57 | 13.56 | 14.75 | 14.75 | 14.75 |
| $B_2O_3$ | 5.63 | 5.25 | 6 | 5.5 | 5 |
| $Na_2O$ | 14.05 | 14.32 | 13.55 | 13.55 | 13.55 |
| $K_2O$ | 0.10 | 0.10 | 0.2 | 0.2 | 0.2 |
| MgO | 0.77 | 0.76 | 0 | 0 | 0 |
| CaO | 0.04 | 0.04 | 0.05 | 0.05 | 0.05 |
| ZnO | 0.00 | 0.00 | 1 | 1.5 | 2 |
| $SnO_2$ | 0.10 | 0.10 | 0.07 | 0.07 | 0.07 |

| Composition (mol %) | Glass 13 | Glass 14 | Glass 15 | Glass 16 | Glass 17 |
|---|---|---|---|---|---|
| $SiO_2$ | 64.5 | 64.5 | 64.5 | 64.5 | 64.5 |
| $Al_2O_3$ | 14.75 | 14.75 | 14.75 | 14.75 | 14.75 |
| $B_2O_3$ | 4.5 | 4 | 7 | 6 | 5.5 |
| $Na_2O$ | 13.55 | 13.55 | 13.55 | 13.55 | 13.55 |
| $K_2O$ | 0.2 | 0.2 | 0.2 | 0.2 | 0.2 |
| MgO | 0 | 0 | 0 | 1 | 1.5 |
| CaO | 0.05 | 0.05 | 0.05 | 0.05 | 0.05 |
| ZnO | 2.5 | 3 | 0 | 0 | 0 |
| $SnO_2$ | 0.07 | 0.07 | 0.07 | 0.07 | 0.07 |

| Composition (mol %) | Glass 18 | Glass 19 | Glass 20 | Glass 21 | Glass 22 |
|---|---|---|---|---|---|
| $SiO_2$ | 64.5 | 64.5 | 64.5 | 64.44 | 64.53 |
| $Al_2O_3$ | 14.75 | 14.75 | 14.75 | 13.99 | 13.99 |
| $B_2O_3$ | 5 | 4.5 | 4 | 7.04 | 6.60 |
| $Na_2O$ | 13.55 | 13.55 | 13.55 | 13.83 | 13.71 |
| $K_2O$ | 0.2 | 0.2 | 0.2 | 0.51 | 0.50 |
| MgO | 2 | 2.5 | 3 | 0.01 | 0.49 |
| CaO | 0.05 | 0.05 | 0.05 | 0.06 | 0.06 |
| $SnO_2$ | 0.07 | 0.07 | 0.07 | 0.10 | 0.10 |

TABLE 2-continued

Compositions and physical properties of fast cooled, fictivated glasses.

| Composition (mol %) | Glass 23 | Glass 24 | Glass 25 | Glass 26 | Glass 27 |
|---|---|---|---|---|---|
| $SiO_2$ | 64.32 | 64.76 | 64.53 | 64.33 | 65.00 |
| $Al_2O_3$ | 14.00 | 13.97 | 13.98 | 14.01 | 13.50 |
| $B_2O_3$ | 6.15 | 5.57 | 5.06 | 4.58 | 3.00 |
| $Na_2O$ | 13.82 | 13.56 | 13.74 | 13.82 | 15.40 |
| $K_2O$ | 0.51 | 0.50 | 0.51 | 0.51 | 0.10 |
| MgO | 1.01 | 1.45 | 2.00 | 2.57 | 3.00 |
| CaO | 0.06 | 0.06 | 0.06 | 0.06 | 0.00 |
| $SnO_2$ | 0.10 | 0.10 | 0.10 | 0.10 | 0.08 |

| Composition (mol %) | Glass 28 | Glass 29 | Glass 30 | Glass 31 | Glass 32 |
|---|---|---|---|---|---|
| $SiO_2$ | 65.00 | 65.00 | 65.00 | 65.00 | 65.00 |
| $Al_2O_3$ | 14.00 | 14.25 | 14.50 | 14.75 | 15.00 |
| $B_2O_3$ | 3.00 | 3.00 | 3.00 | 3.00 | 3.00 |
| $Na_2O$ | 14.90 | 14.65 | 14.40 | 14.15 | 13.90 |
| $K_2O$ | 0.10 | 0.10 | 0.10 | 0.10 | 0.10 |
| MgO | 3.00 | 3.00 | 3.00 | 3.00 | 3.00 |
| CaO | 0.00 | 0.00 | 0.00 | 0.00 | 0.00 |
| $SnO_2$ | 0.08 | 0.08 | 0.08 | 0.08 | 0.08 |

Table 3a lists ion exchange properties of glasses 2-6 from Table 1. Ion exchange ("IX" in Tables 3a and 3b) was performed for fusion formed glasses ("as-drawn" in Table 3a) and for glasses annealed at 600° C. for 20 hours, and at 630° C. for 2 hours. The compressive stress (CS) and depth of layer (DOL) were obtained as a result of treatment of annealed samples in $KNO_3$ (refined grade) at 410° C. for a time sufficient to obtain a depth of layer of about 50 μm. The average compressive stresses (CS) and depths of layer (DOL) for the glasses listed in Tables 1 and 3a are plotted in FIG. 1. Table 3b lists ion exchange properties of selected silicate glasses from Table 2 which were either annealed or fictivated as described herein.

TABLE 3a

Ion exchange properties of silicate glasses listed in Tables 1 and 2.

| | 4318 | Glass 2 | Glass 3 | Glass 4 | Glass 5 | Glass 6 | 2320 |
|---|---|---|---|---|---|---|---|
| Annealed 20 hr at 600° C. | | | | | | | |
| CS (MPa) | 1084 | 1082 | 1088 | 1080 | 1095 | 1090 | 1090 |
| DOL (μm) | 45.2 | 45.2 | 45 | 46.9 | 45.3 | 47.2 | 46.9 |
| IX time (hr) | 18 | 17.3 | 16.4 | 15.6 | 16.4 | 15.6 | 15.6 |
| Annealed 20 hr at 630° C. | | | | | | | |
| CS (MPa) | 1038 | 1023 | 1016 | 1035 | 1040 | 1033 | 1032 |
| DOL (μm) | 46.7 | 47.5 | 48 | 46.7 | 47.5 | 48.1 | 48.4 |
| IX time (hr) | 15.1 | 14.6 | 13.8 | 13.2 | 13.8 | 13.2 | 13.2 |
| As-Drawn | | | | | | | |
| CS (MPa) | 893 | 929 | 903.2 | 893 | 882.5 | 885 | 877 |
| DOL (μm) | 52.1 | 47.6 | 51.6 | 52.1 | 53 | 53.8 | 54.4 |
| IX time (hr) | 11.8 | 11.3 | 10.6 | 10.6 | 10 | 10 | 10 |

TABLE 3b

Ion exchange properties of fictivated and annealed
silicate glasses listed in Table 2.

|  | Glass 14 | Glass 15 | Glass 16 | Glass 17 | Glass 18 | Glass 19 |
|---|---|---|---|---|---|---|
| Annealed |  |  |  |  |  |  |
| CS (MPa) | 897.6 | 952.3 | 972.9 | 1002.4 | 1026.2 | 1032.9 |
| DOL (μm) | 42.8 | 40.5 | 39.4 | 38.2 | 37.5 | 36.0 |
| IX temp. (° C.) | 410 | 410 | 410 | 410 | 410 | 410 |
| IX time (h) | 8 | 8 | 8 | 8 | 8 | 8 |
| Fictivated |  |  |  |  |  |  |
| CS (MPa) | 809.7 | 861.3 | 883.2 | 912.1 | 930.8 | 938.1 |
| DOL (μm) | 45.5 | 42.4 | 40.1 | 38.3 | 37.3 | 36.8 |
| IX temp. (° C.) | 390 | 390 | 390 | 390 | 390 | 390 |
| IX time (h) | 8 | 8 | 8 | 8 | 8 | 8 |

Figure 2:
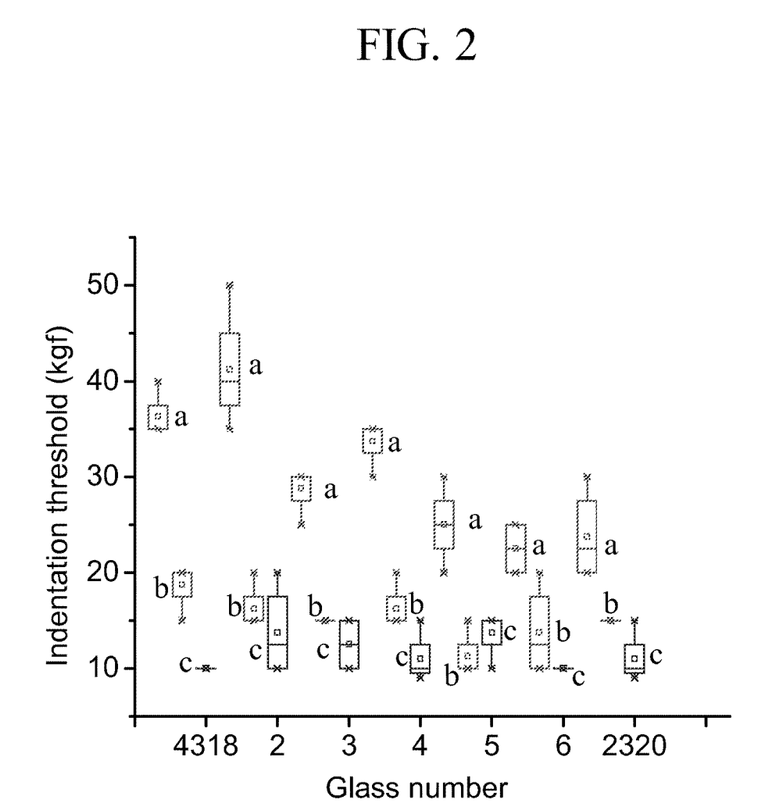
FIG. 2 is a plot of Vickers indentation thresholds obtained for ion exchanged fusion drawn glass and annealed glasses.

The thermal history dependence of Vickers indentation threshold for the glasses listed in Tables 1 and 3a was studied. Vickers indentation thresholds obtained for fusion drawn glass and annealed glasses are compared in FIG. 2. The glass compositions are listed in Table 1 and the corresponding compressive stresses and depths of layer are listed in Table 3. Four samples were tested for each condition. Indentation threshold values measured for ion exchanged samples having a depth of layer in the 40-50 μm range. The effect of thermal history on indentation threshold was studied for annealed and fusion formed samples. The glasses were fictivated or fast cooled from a temperature that was about 60° C. to 70° C. higher than their respective anneal points. The as-formed annealed and fictivated glasses were ion exchanged in a potassium nitrate salt bath. All ion exchanged glasses from these two different approaches were studied for indentation threshold. The fictivated glasses (labeled "a" in FIG. 2) exhibited higher Vickers indentation thresholds than the annealed glasses.

Figure 3:
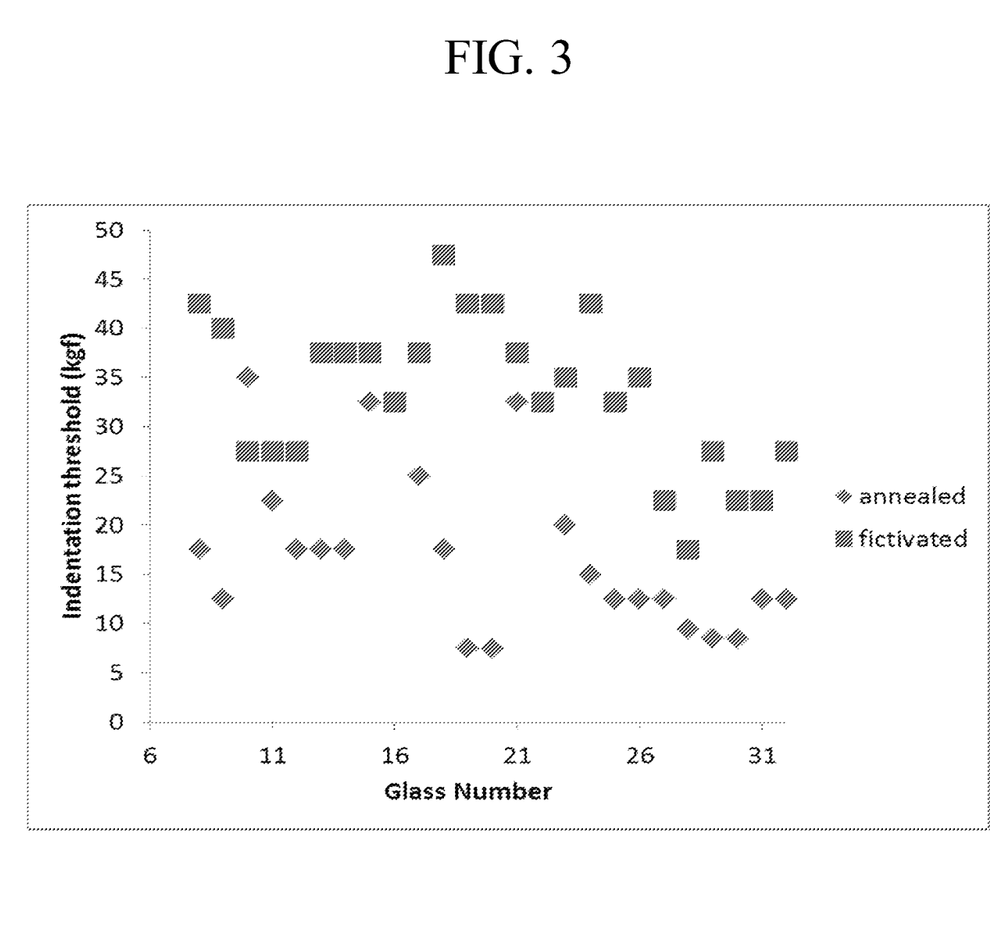
FIG. 3 is a plot of Vickers indentation thresholds obtained for ion exchanged fictivated and annealed samples having the glass compositions listed in Tables 2 and 3b.

Vickers indentation thresholds obtained for ion exchanged fictivated and annealed samples having the glass compositions listed in Tables 2 and 3b are plotted in FIG. 3. Fictivation results in higher indentation thresholds for all compositions studied.

In some aspects, the silicate glasses described herein have a zircon breakdown temperature that is equal to the temperature at which the viscosity of the glass is in a range from about 30 kPoise to about 35 kPoise, in some embodiments, in a range from about 70 kPoise to about 80 kPoise, and, in a particular embodiment, from 30 kPoise to about 35 kPoise. As used herein, the term "zircon breakdown temperature" or "$T^{breakdown}$" refers to the temperature at which zircon—which is commonly used as a refractory material in glass processing and manufacture—breaks down to form zirconia and silica. In isoviscous processes such as fusion, the highest temperature experienced by the glass corresponds to a particular viscosity of the glass. For example, "$T^{35kP}$" refers to the temperature at which the glass has a viscosity of 35 kilopoise (kP). The difference between the breakdown temperature and the temperature corresponding to 35,000 poise viscosity is defined as the breakdown margin $T^{margin}$, where: $T^{margin} = T^{breakdown} - T^{35kp}$. When the breakdown margin $T^{margin}$ is negative, zircon will breakdown to form zirconia defects at some location on the isopipe. When $T^{margin}$ is zero, it is still possible that temperature excursions could cause zircon breakdown to occur. It is therefore desirable not only to make the breakdown margin positive, but to maximize $T^{margin}$ as much as possible while being consistent with all the other attributes that must be maintained in the final glass product. In some embodiments, the silicate glasses contain less than about one inclusion per kilogram of silicate glass, the inclusion having a diameter of at least 50 μm.

A method of making the silicate glasses described hereinabove is also provided. The silicate glass has a Vickers crack initiation threshold of at least 15 kgf and, comprises: at least about 50 mol % $SiO_2$; at least about 10 mol % $R_2O$, wherein $R_2O$ comprises $Na_2O$; $Al_2O_3$; and $B_2O_3$, and wherein $B_2O_3$ (mol %)–($R_2O$ (mol %)–$Al_2O_3$ (mol %))≥2 mol %. The glass is first heated to a first temperature that is greater than the anneal point of the glass, and then fast cooled at a rate of at least about 5° C./s from the first temperature to a second temperature that is less than the strain point of the glass. In some embodiments, the method further includes providing the silicate glass by slot-drawing, fusion-drawing, rolling, or float processing. In certain embodiments, the method further includes ion exchanging the fast cooled silicate glass to form a layer under a compressive stress, the layer extending from a surface of the silicate glass into the silicate glass to a depth of layer.

While typical embodiments have been set forth for the purpose of illustration, the foregoing description should not be deemed to be a limitation on the scope of the disclosure or appended claims. Accordingly, various modifications, adaptations, and alternatives may occur to one skilled in the art without departing from the spirit and scope of the present disclosure or appended claims.

The invention claimed is:

1. A silicate glass, the silicate glass having a zircon breakdown temperature that is equal to a temperature at which the silicate glass has a viscosity in a range from about 30 kPoise to about 40 kPoise, a Vickers crack initiation threshold of at least 15 kgf, and a strain point, the silicate glass comprising:
   at least about 50 mol % $SiO_2$;
   at least about 10 mol % $R_2O$, wherein $R_2O$ comprises $Na_2O$;
   $Al_2O_3$, wherein −0.5 mol %≤$Al_2O_3$(mol %)−$R_2O$(mol %)≤2 mol %; and
   $B_2O_3$, wherein $B_2O_3$(mol %)−($R_2O$(mol %)−$Al_2O_3$(mol %))≥4.5 mol %, wherein the silicate glass has a fictive temperature that is greater than or equal to a temperature at which a super-cooled liquid having a composition of the silicate glass has a viscosity of $10^{12}$ Poise.

2. The silicate glass of claim 1, wherein the silicate glass has a Vickers crack initiation threshold of at least about 25 kgf.

3. The silicate glass of claim 1, wherein the silicate glass has a layer under a compressive stress of at least about 800 MPa, the layer extending from a surface of the silicate glass into the silicate glass to a depth of layer of at least about 45 gm.

4. The silicate glass of claim 1, wherein the silicate glass comprises from about 60 mol % to about 66 mol % $SiO_2$.

5. The silicate glass of claim 1, wherein the silicate glass comprises at least about 0.1 mol % of at least one of MgO and ZnO.

6. The silicate glass of claim 1, wherein the silicate glass comprises greater than 4.5 mol % $B_2O_3$ in which boron cations are three-fold coordinated.

7. The silicate glass of claim 1, wherein the silicate glass comprises: at least about 50 mol % $SiO_2$, from about 12 mol % to about 22 mol % $Al_2O_3$; from about 4.5 mol % to about 10 mol % $B_2O_3$; from about 10 mol % to about 20 mol % $Na_2O$; from 0 mol % to about 5 mol % $K_2O$; 0 mol %≤MgO≤6 mol %; 0 mol %≤ZnO≤6 mol %; and, optionally, at least one of CaO, BaO, and SrO, wherein 0 mol %≤CaO+SrO+BaO≤2 mol %.

8. The silicate glass of claim 1, further comprising at least one transition metal colorant, the transition metal oxide colorant comprising at least one of $V_2O_5$, NiO, CuO, $Cr_2O_3$, $MnO_2$, $Co_3O_4$, $Nb_2O_5$, and $TiO_2$.

9. The silicate glass of claim 8, wherein 0 mol %≤$V_2O_5$≤6 mol %, 0 mol %≤NiO≤6 mol %, 0 mol %≤CuO≤6 mol %, 0 mol %≤$Cr_2O_3$≤6 mol %, 0 mol %≤$MnO_2$≤6 mol %, 0 mol %≤$Fe_2O_3$≤6 mol %, 0 mol %≤$Co_3O_4$≤6 mol % 0 mol %≤$Nb_2O_5$≤6 mol %, and 0 mol %≤$TiO_2$≤6 mol %.

10. The silicate glass of claim 1, further including $P_2O_5$ wherein 4.5 mol %≤$B_2O_3$ (mol %)+$P_2O_5$ (mol %)≤10 mol %.

11. The silicate glass of claim 1, wherein the silicate glass is fast cooled from a first temperature at which the glass has a viscosity in a range from about $10^9$ poise to about $10^{13}$ poise to a second temperature that is below the strain point.

12. The silicate glass of claim 1, wherein the silicate glass forms at least a portion of a cover plate, a touch screen, a watch crystal, a solar concentrator, a window, a screen, or a container.

13. The silicate glass of claim 1, wherein the silicate glass has a fictive temperature that is greater than a temperature at which a super-cooled liquid having a composition of the silicate glass has a viscosity of $10^{11}$ Poise.

14. A silicate glass, the silicate glass having a zircon breakdown temperature that is equal to a temperature at which the silicate glass has a viscosity in a range from about 30 kPoise to about 40 kPoise, a Vickers crack initiation threshold of at least 15 kgf, and a strain point, the silicate glass comprising:
   at least about 50 mol % $SiO_2$;
   at least about 10 mol % $R_2O$, wherein $R_2O$ comprises $Na_2O$;
   $Al_2O_3$, wherein $Al_2O_3$(mol %)<$R_2O$(mol %); and
   $B_2O_3$, wherein $B_2O_3$(mol %)−($R_2O$(mol %)−$Al_2O_3$(mol %))≥2 mol %, wherein the silicate glass has a fictive temperature that is greater than or equal to a temperature at which a super-cooled liquid having a composition of the silicate glass is $10^{12}$ Poise.

15. The silicate glass of claim 14, wherein the silicate glass has a layer under a compressive stress of at least about 800 MPa, the layer extending from a surface of the silicate glass into the silicate glass to a depth of layer of at least about 45 pm.

16. The silicate glass of claim 14, wherein the Vickers crack initiation threshold is at least about 25 kgf.

17. The silicate glass of claim 14, wherein the silicate glass comprises from about 3 mol % to about 4.5 mol % $B_2O_3$ in which boron cations are three-fold coordinated.

18. The silicate glass of claim 14, wherein $B_2O_3$(mol %)−($R_2O$(mol %)−$Al_2O_3$(mol %))≤4.5 mol %.

19. The silicate glass of claim 14, wherein the silicate glass comprises from about 66 mol % to about 74 mol % $SiO_2$.

20. The silicate glass of claim 14, wherein the silicate glass comprises at least about 0.1 mol % of at least one of MgO and ZnO.

21. The silicate glass of claim 14, wherein the glass comprises: at least about 50 mol % $SiO_2$, from about 9 mol % to about 22 mol % $Al_2O_3$; from about 3 mol % to about 10 mol % $B_2O_3$; from about 9 mol % to about 20 mol % $Na_2O$; from 0 mol % to about 5 mol % $K_2O$; 0 mol %≤MgO≤6 mol %; 0 mol %≤ZnO≤6 mol %; and, optionally, at least one of CaO, BaO, and SrO, wherein 0 mol %≤CaO+SrO+BaO≤2 mol %.

22. The silicate glass of claim 14, wherein the silicate glass contains less than about one inclusion per kilogram of silicate glass, the inclusion having a diameter of at least 50 µm.

23. The silicate glass of claim 14, further comprising at least one transition metal colorant, the transition metal oxide colorant comprising at least one of $V_2O_5$, NiO, CuO, $Cr_2O_3$, $MnO_2$, $Co_3O_4$, $Nb_2O_5$, and $TiO_2$.

24. The silicate glass of claim 23, wherein 0 mol %≤$V_2O_5$≤6 mol %, 0 mol %≤NiO≤6 mol %, 0 mol %≤CuO≤6 mol %, 0 mol %≤$Cr_2O_3$≤6 mol %, 0 mol%≤$MnO_2$≤6 mol %, 0 mol %≤$Fe_2O_3$≤6 mol %, 0 mol %≤$Co_3O_4$≤6 mol % 0 mol %≤$Nb_2O_5$≤6 mol %, and 0 mol %≤$TiO_2$≤6 mol %.

25. The silicate glass of claim 14, wherein the silicate glass is fast cooled from a first temperature at which the glass has a viscosity in a range from about $10^9$ poise to about $10^{13}$ poise to a second temperature that is below the strain point.

26. The silicate glass of claim 14, wherein the silicate glass forms at least a portion of a cover plate, a touch screen, a watch crystal, a solar concentrator, a window, a screen, or a container.

27. A method of making a silicate glass comprising: at least about 50 mol % $SiO_2$; at least about 10 mol % $R_2O$, wherein $R_2O$ comprises $Na_2O$; $Al_2O_3$, wherein $Al_2O_3$(mol %)<$R_2O$(mol %); and $B_2O_3$, and wherein $B_2O_3$(mol %)−($R_2O$(mol %)−$Al_2O_3$(mol %))≥2; the method comprising:
   a. heating the silicate glass to a first temperature, the first temperature being greater than an anneal point of the silica glass; and
   b. fast cooling the silicate glass at a rate of at least 5° C./s from a first temperature at which the glass has a viscosity in a range from about $10^9$ poise to about $10^3$ poise to a second temperature, the second temperature being less than a strain point of the silicate glass;
   wherein the fast cooled silicate glass has a zircon breakdown temperature that is equal to a temperature at which the silicate glass has a viscosity in a range from about 30 kPoise to about 40 kPoise, a Vickers crack initiation threshold of at least 15 kgf, and a fictive temperature that is greater than or equal to a temperature at which a super-cooled liquid having a composition of the silicate glass has a viscosity of $10^{12}$ Poise.

28. The method of claim 27, further comprising providing the silicate glass by slot-drawing, fusion-drawing, rolling, or float processing.

29. The method of claim 27, further comprising ion exchanging the fast cooled silicate glass to form a layer under a compressive stress, the layer extending from a surface of the silicate glass into the silicate glass to a depth of layer.

30. The method of claim 29, wherein the compressive stress is at least about 800 MPa.

31. The method of claim 29, wherein the depth of layer is at least about 45 µm.

32. The method of claim 27, wherein the Vickers crack initiation threshold of the fast cooled silicate glass is at least about 25 kgf.

33. The method of claim 27, wherein the silicate glass comprises: least about 50 mol % $SiO_2$, from about 12 mol % to about 22 mol % $Al_2O_3$; from about 4.5 mol % to about 10 mol % $B_2O_3$; from about 10 mol % to about 20 mol % $Na_2O$; from 0 mol % to about 5 mol % $K_2O$; 0 mol %≤MgO≤6 mol %; 0 mol %≤ZnO≤6 mol %; and, optionally, at least one of CaO, BaO, and SrO, wherein 0 mol %≤CaO+SrO+BaO≤2 mol %.

34. The method of claim 27, wherein the glass comprises: at least about 50 mol % $SiO_2$, from about 9 mol % to about 22 mol % $Al_2O_3$; from about 3 mol % to about 10 mol % $B_2O_3$; from about 9 mol % to about 20 mol % $Na_2O$; from 0 mol % to about 5 mol % $K_2O$; 0 mol %≤MgO≤6 mol %; 0 mol %≤ZnO≤6 mol %; and, optionally, at least one of CaO, BaO, and SrO, wherein 0 mol %≤CaO+SrO+BaO≤2 mol %.

35. The method of claim 27, wherein the second temperature is about 25° C.±15° C.

* * * * *

UNITED STATES PATENT AND TRADEMARK OFFICE
CERTIFICATE OF CORRECTION

PATENT NO. : 10,494,292 B2
APPLICATION NO. : 14/764799
DATED : December 3, 2019
INVENTOR(S) : Matthew John Dejneka et al.

It is certified that error appears in the above-identified patent and that said Letters Patent is hereby corrected as shown below:

On the Title Page

In Column 2, item (56), U.S. PATENT DOCUMENTS, Line 1, delete "Hera" and insert -- Hara --, therefor.

In the Claims

In Column 12, Line 54, Claim 3, delete "gm." and insert -- µm. --, therefor.

In Column 13, Line 11 (approx.), Claim 9, delete "mol %" and insert -- mol %, --, therefor.

In Column 13, Line 13 (approx.), Claim 10, delete "P₂O₅" and insert -- $P_2O_5$, --, therefor.

In Column 13, Line 19, Claim 11, delete "about $10^{13}$" and insert -- less than $10^{11}$ --, therefor.

In Column 13, Line 44, Claim 14, delete "is" and insert -- has a viscosity of --, therefor.

In Column 13, Line 49, Claim 15, delete "pm." and insert -- µm. --, therefor.

In Column 14, Line 16, Claim 24, delete "mol %" and insert -- mol %, --, therefor.

In Column 14, Lines 20-21, Claim 25, delete "to about $10^{13}$" and insert -- less than $10^{11}$ --, therefor.

In Column 14, Line 64, Claim 33, delete "least" and insert -- at least --, therefor.

Signed and Sealed this
Twenty-fourth Day of March, 2020

Andrei Iancu
*Director of the United States Patent and Trademark Office*